United States Patent
Watkins

(10) Patent No.: US 11,358,375 B1
(45) Date of Patent: Jun. 14, 2022

(54) FLEXIBLE MICROMETEOROID SHIELD

(71) Applicant: Space Systems/Loral, LLC, Palo Alto, CA (US)

(72) Inventor: Brian Watkins, Menlo Park, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 0 days.

(21) Appl. No.: 17/089,610

(22) Filed: Nov. 4, 2020

(51) Int. Cl.
*B32B 27/06* (2006.01)
*B64G 1/56* (2006.01)
(Continued)

(52) U.S. Cl.
CPC .............. *B32B 27/065* (2013.01); *B32B 3/08* (2013.01); *B32B 5/18* (2013.01); *B32B 15/046* (2013.01); *B32B 15/09* (2013.01); *B32B 15/20* (2013.01); *B32B 27/36* (2013.01); *B32B 37/185* (2013.01); *B32B 38/0004* (2013.01); *B64G 1/56* (2013.01); *B32B 2250/40* (2013.01); *B32B 2255/10* (2013.01); *B32B 2255/205* (2013.01); *B32B 2266/0214* (2013.01); *B32B 2305/022* (2013.01); *B32B 2305/026* (2013.01); *B32B 2305/34* (2013.01); *B32B 2307/202* (2013.01);
(Continued)

(58) Field of Classification Search
CPC ......... B32B 27/065; B32B 27/36; B32B 5/18; B32B 15/20; B32B 15/09; B32B 2255/10; B32B 2255/205; B32B 2307/558; B32B 2307/202; B32B 2305/34; B32B 2605/18; B32B 2379/08; B32B 2305/026; B32B 2311/12; B32B 2311/24; B32B 2571/00; B32B 2266/0214; B32B 2367/00; B32B 2307/212; B32B 2305/022; B32B 2250/40; B64G 1/56; Y10T 428/24967; Y10T 428/2495
See application file for complete search history.

(56) References Cited

U.S. PATENT DOCUMENTS

| | | |
|---|---|---|
| 5,067,388 A | 11/1991 | Crews et al. |
| 5,610,363 A | 3/1997 | Crews et al. |

(Continued)

FOREIGN PATENT DOCUMENTS

| | | |
|---|---|---|
| CN | 109268625 A | 1/2019 |
| CN | 109587981 A | 4/2019 |

(Continued)

OTHER PUBLICATIONS

[NPL-1] Dunmore, "Copper Coated Film"; Jul. 22, 2017, <http://www.dunmore.com/products/copper-coated-film.html>. (Year: 2017).*

(Continued)

*Primary Examiner* — David Sample
*Assistant Examiner* — Donald M Flores, Jr.
(74) *Attorney, Agent, or Firm* — Weaver Austin Villeneuve & Sampson LLP

(57) ABSTRACT

A multilayer particle shield for a spacecraft includes an inboard exterior layer configured to be disposed proximal to the spacecraft, an outboard exterior layer configured to be disposed distal from the spacecraft and at least one interior (Continued)

layer disposed between the inboard exterior layer and the outboard exterior layer, wherein the interior layer includes a semi-rigid, porous, compressible spacer.

20 Claims, 6 Drawing Sheets

(51) Int. Cl.
| | |
|---|---|
| B32B 5/18 | (2006.01) |
| B32B 38/00 | (2006.01) |
| B32B 37/18 | (2006.01) |
| B32B 3/08 | (2006.01) |
| B32B 27/36 | (2006.01) |
| B32B 15/20 | (2006.01) |
| B32B 15/09 | (2006.01) |
| B32B 15/04 | (2006.01) |

(52) U.S. Cl.
CPC ... *B32B 2307/212* (2013.01); *B32B 2307/546* (2013.01); *B32B 2307/558* (2013.01); *B32B 2311/12* (2013.01); *B32B 2311/24* (2013.01); *B32B 2367/00* (2013.01); *B32B 2379/08* (2013.01); *B32B 2571/00* (2013.01); *B32B 2605/18* (2013.01); *Y10T 428/2495* (2015.01); *Y10T 428/24967* (2015.01)

(56) References Cited

U.S. PATENT DOCUMENTS

| | | | |
|---|---|---|---|
| 6,623,826 B2 | 9/2003 | Hasegawa et al. | |
| 6,899,009 B2 | 5/2005 | Christiansen et al. | |
| 7,252,890 B1 | 8/2007 | Wong | |
| 9,640,288 B1 | 5/2017 | Wong | |
| 2012/0175467 A1* | 7/2012 | Dye | F16L 59/065 |
| | | | 244/171.7 |
| 2017/0121038 A1* | 5/2017 | Dong | B64G 1/12 |
| 2018/0139872 A1 | 5/2018 | Song et al. | |

FOREIGN PATENT DOCUMENTS

| | | |
|---|---|---|
| EP | 1120795 | 8/2001 |
| WO | WO 2018/146651 A1 | 8/2018 |

OTHER PUBLICATIONS

Christiansen et al., "Enhanced Meteoroid and Orbital Debris Shielding," NASA Johnson Space Center, Houston, TX; NASA Marshall Space Flight Center, Huntsville, AL, Elsevier Science Ltd Printed in Great Britain 0734-743X/95, Int. J. Impact Engng, vol. 17, pp. 217 228, 1995.

* cited by examiner

FLEXIBLE MICROMETEOROID SHIELD

TECHNICAL FIELD

This invention relates generally to protective shields for space applications, and, more particularly, to flexible shielding for protection against micrometeoroids and orbital debris.

BACKGROUND OF THE INVENTION

The assignee of the present invention manufactures and deploys spacecraft for, inter alia, communications and broadcast services. Such spacecraft may be required to survive an extended life (10 years or more) in a space environment that includes significant exposure to potentially damaging impact damage from micrometeoroids and orbital debris, radiation, electromagnetic interference and electrostatic charging in space that can lead to damaging electrostatic discharge events.

Because such spacecraft include electronic components and other components that are susceptible to damage from such hazards, various shielding schemes are known in the art. For example, many spacecraft include hard wall enclosures including rigid panels of carbon composite or aluminum honeycomb within which equipment is disposed. Flexible shielding, effective against radiation but not intended to protect against damage from micrometeoroids and orbital debris have also been described, for example, in EP1120795, and U.S. Pat. No. 9,640,288 assigned to the assignee of the present invention, and hereby incorporated by reference into the present application for all purposes. Hypervelocity impact shields, usually referred to as "Whipple Shields" are also known, as described in U.S. Pat. Nos. 5,610,363 and 5,067,388.

Improved shielding techniques affording lower mass and reduced installation cost, particularly for equipment to be disposed or deployed outside hard wall enclosures, or to complete the enclosure of a hard-walled volume are desirable.

SUMMARY

According to some implementations, an apparatus includes a multilayer particle shield for a spacecraft, the particle shield including an inboard exterior layer configured to be disposed proximal to the spacecraft, an outboard exterior layer configured to be disposed distal from the spacecraft and at least one interior layer disposed between the inboard exterior layer and the outboard exterior layer. The interior layer includes a semi-rigid, porous, compressible spacer.

In some examples, the inboard exterior layer and the outboard exterior layer comprise a polyester or polyimide film. In some examples, the polyester or polyimide film is metalized with an aluminum or copper alloy.

In some examples, the interior layer may have a thickness no less than 50 times larger than a respective thickness of the inboard exterior layer and the outboard exterior layer. In some examples, a metallized portion of each of the inboard exterior layer and the outboard exterior layer may have a first thickness in the range of 1-5 mils. In some examples, the first thickness may be about 2 mils. In some examples, the interior layer may include a polyimide foam having a density of at least 5 kg/m$^3$ and a 50% compression force deflection greater than 5 kPa. In some examples, the interior layer may have a second thickness in the range of 0.1 to 0.5 inches. In some examples, the second thickness is about 0.3 inches.

In some examples, the interior layer may include an inboard sublayer, an outboard sublayer and a central sublayer disposed therebetween, the inboard sublayer and the outboard sublayer may be configured as semi-rigid, porous, compressible spacers, and the central sublayer may include a metalized film.

In some examples, apparatus may further include an electrically conductive coupling between at least a metalized portion of the inboard exterior layer and a metalized portion of the outboard exterior layer. In some examples, the electrically conductive coupling may include a conductive tape disposed around at least a portion of a perimeter of the particle shield.

In some examples, the apparatus may further include one or more inserts configured to prevent outward bulging of the outboard exterior layer.

In some examples, one or both of the inboard exterior layer and the outboard exterior layer may include or be associated with an RF shield. In some examples, the RF shield may include a polyester-aluminum laminate.

In some examples, one or both of the inboard exterior layer and the outboard exterior layer may include or be associated with a particle radiation shield.

In some examples, the particle radiation shield may include copper or a copper alloy having a third thickness of about 5 mils.

According to some implementations, a method includes installing a multilayer particle shield onto a spacecraft, the particle shield including a first exterior layer, a second exterior layer and at least one interior layer disposed between the first exterior layer and the second exterior layer. The interior layer includes a semi-rigid, porous, compressible spacer and installing the particle shield includes disposing the first exterior layer proximal to the spacecraft.

In some examples, the interior layer may have a thickness no less than 50 times larger than a respective thickness of the first exterior layer and the second exterior layer. In some examples, the first exterior layer and the second exterior layer may be configured from metalized polyester film and the interior layer may include a polyimide foam having a density of at least 5 kg/m$^3$ and a 50% compression force deflection greater than 5 kPa. In some examples, the interior layer may include an inboard sublayer, an outboard sublayer and a central sublayer disposed therebetween, the inboard sublayer and the outboard sublayer may be configured as semi-rigid, porous, compressible spacers, and the central sublayer may include a metalized polyester film.

In some examples, the particle shield may include a first electrically conductive coupling between at least a metalized portion of the first exterior layer and a metalized portion of the second exterior layer; and installing the particle shield may include providing a second electrically conductive coupling between the first electrically conductive coupling and an electrical ground point of the spacecraft.

In some examples, installing the particle shield may include cutting, from a bulk amount of multilayer sheet stock, layers of the multilayer particle shield having a shape defined by a planar pattern, stacking and joining the cut layers, and forming the particle shield to fit a spacecraft location.

According to some implementations, a spacecraft includes equipment and an enclosure and a multilayer particle shield, the particle shield including an inboard exterior layer configured to be disposed proximal to the equipment and/or the enclosure, an outboard exterior layer configured to be disposed distal from the inboard exterior layer and at least one interior layer disposed between the inboard exterior layer and the outboard exterior layer, wherein the interior layer includes a semi-rigid, porous, compressible spacer.

In some examples, the inboard exterior layer and the outboard exterior layer may include a metalized polyester film and the interior layer may include a polyimide foam having a density of at least 5 kg/m³ and a 50% compression force deflection greater than 5 kPa. In some examples, the interior layer may have a thickness no less than 50 times larger than a respective thickness of the inboard exterior layer and the outboard exterior layer.

In some examples, the interior layer may include an inboard sublayer, an outboard sublayer and a central sublayer disposed therebetween; the inboard sublayer and the outboard sublayer may be configured as semi-rigid, porous, compressible spacers; and the central sublayer may include a metalized polyester film.

In some examples, the spacecraft may further include a first electrically conductive coupling between at least a metalized portion of the inboard exterior layer and a metalized portion of the outboard exterior layer; and a second electrically conductive coupling between the first electrically conductive coupling and an electrical ground point of the spacecraft.

BRIEF DESCRIPTION OF THE DRAWINGS

Features of the invention are more fully disclosed in the following detailed description of the preferred embodiments, reference being had to the accompanying drawings, in which.

Figure 1:
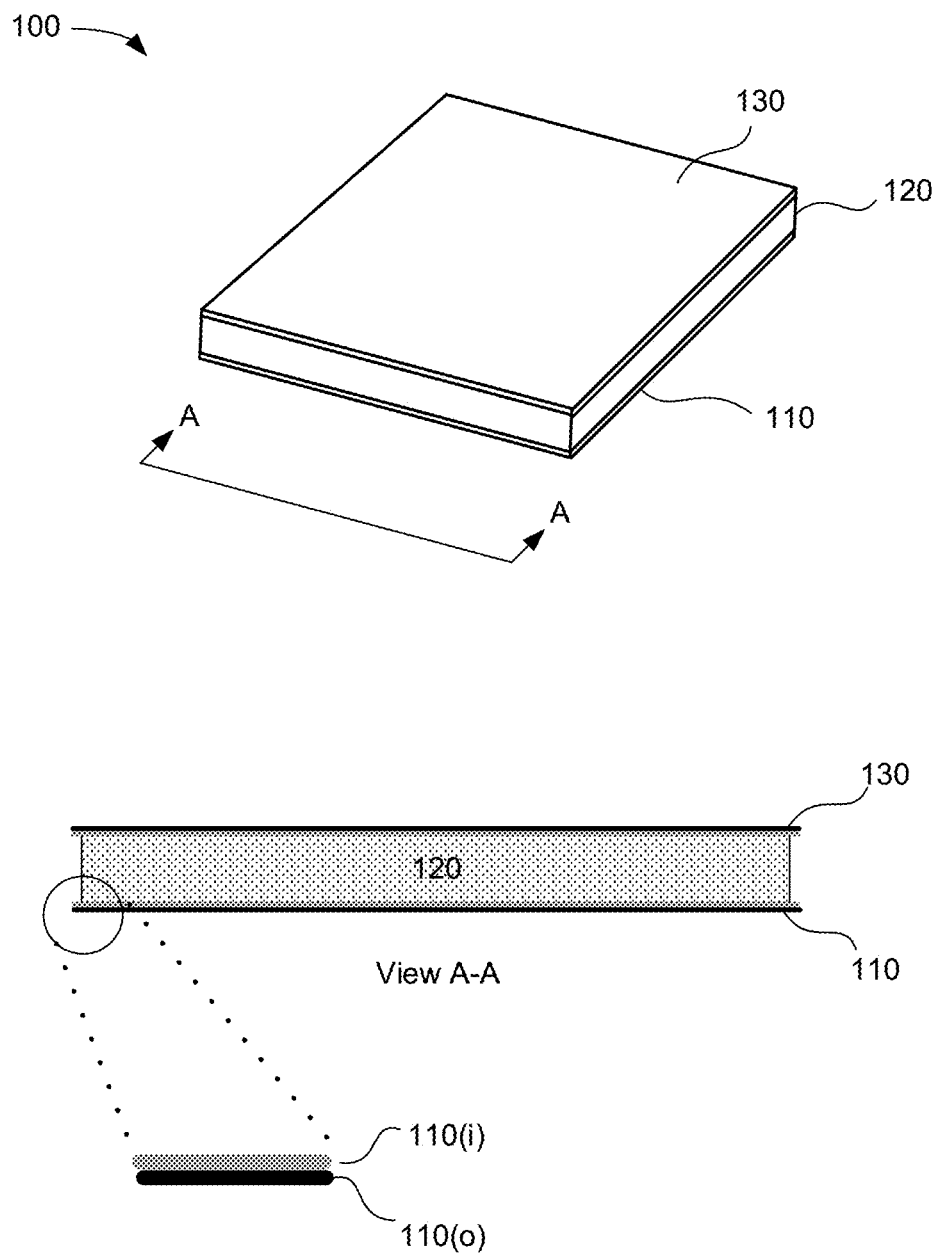
FIG. 1 illustrates an example of a spacecraft particle shield according to an implementation.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific examples of embodiments will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or". As used herein, the term "mil" means 0.001 inches.

The presently disclosed techniques contemplate a semi-rigid, particle shield ("shield" or "blanket") that includes a multi-layer stack of at least two thin and flexible exterior layers and one or more relatively thick interior layers. In a typical use case, an inboard one of the exterior layers may be disposed proximal to a portion of a spacecraft, whereas an outboard one of the exterior layers may be disposed distal from the spacecraft. The one or more interior layers may be configured as porous, and compressible spacers. Referring to FIG. 1, a shield 100 includes an inboard exterior layer 110, an outboard exterior layer 130 and an interior layer 120 disposed therebetween. In some implementations, the interior layer may be formed from a polyimide foam having a density of about 5-10 kg/m³ and exhibit a 50% compression force deflection greater than 5 kPa. The polyimide foam may be porous (e.g., open cell) so as to permit venting/outgassing during launch ascent. An example of a suitable polyimide foam material is marketed under the trade name Solimide TA-301 from Boyd Corporation, of Pleasanton Calif.

The exterior layers may be formed from a metalized polyester or polyimide film, such as aluminized Mylar, for example. As may be better observed in the magnified portion of View A-A, an inner portion 110(i) of the exterior layer 110 may be formed from a polyester or polyimide, and an outer portion 110(o) of the exterior layer 110 may be metalized with an aluminum or copper alloy, for example. Similarly, exterior layer 130 may be configured to include an inner portion formed from a polyester or polyimide, and an outer, metalized, portion. The metalized portion, in some implementations, has a thickness of approximately 2 mils.

The thickness of the interior layer is expected to be substantially greater than the thickness of either exterior layer. For example, the interior layer may have a thickness at least 50 times larger than a respective thickness of the first exterior layer and the second exterior layer. In some implementations, the interior layer may be configured to have a thickness in the range of 0.1 to 0.5 inches, whereas the exterior layers may have a thickness less than 10 mils. In some implementations, the interior layer has a thickness of about 0.3 inch. In some implementations, a metalized portion of each exterior layer has a thickness in the range of 1-5 mils. In an implementation, the metalized portion of each exterior layer has a thickness of about 2 mil.

Advantageously, the interior layer or layers may be semi-rigid to maintain spacing between the inboard and outboard exterior layers. The interior layer may be scored and/or perforated to facilitate bending of the multi-layer blanket. The interior layer, advantageously, may be self-venting as a result of being formed from a porous, open celled material or open structure.

Figure 2:
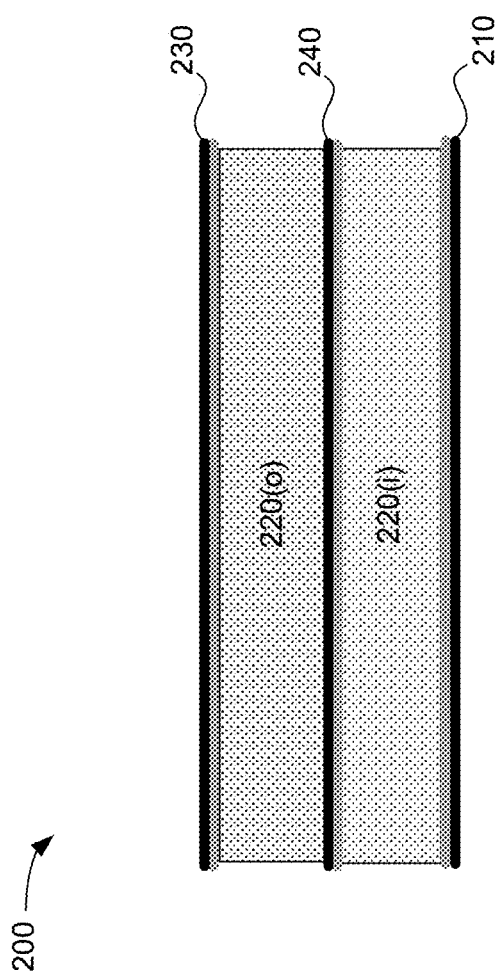
FIG. 2 illustrates an example of a spacecraft particle shield according to a further implementation.

In some implementations two or more interior sublayers may be contemplated. FIG. 2 illustrates an example implementation including two interior sublayers of polyimide foam. An outboard sublayer 220(*o*) of polyimide foam is separated from inboard sublayer 220(*i*) of polyimide foam by a metallized polyimide layer 240 disposed therebetween. Thus, the illustrated implementation includes two sublayers of relatively thick polyimide foam interleaved with at least one thin and flexible layer 240 of metallized polyimide. The interior sublayers 220 are disposed between an inboard exterior layer 210 and an outboard exterior layer 230. It will be appreciated that, in the implementation illustrated by FIG. 2, shielding against micrometeoroids or orbital debris is enhanced by provision of three metalized polyimide layers, spaced apart by the interior layers 220.

Configurations with additional sublayers are also within the contemplation of the present disclosure. For example, an implementation may include four metalized polyimide layers, spaced apart by the three interior polyimide foam sublayers, or five metalized polyimide layers, spaced apart by the four interior polyimide foam sublayers.

Figure 3:
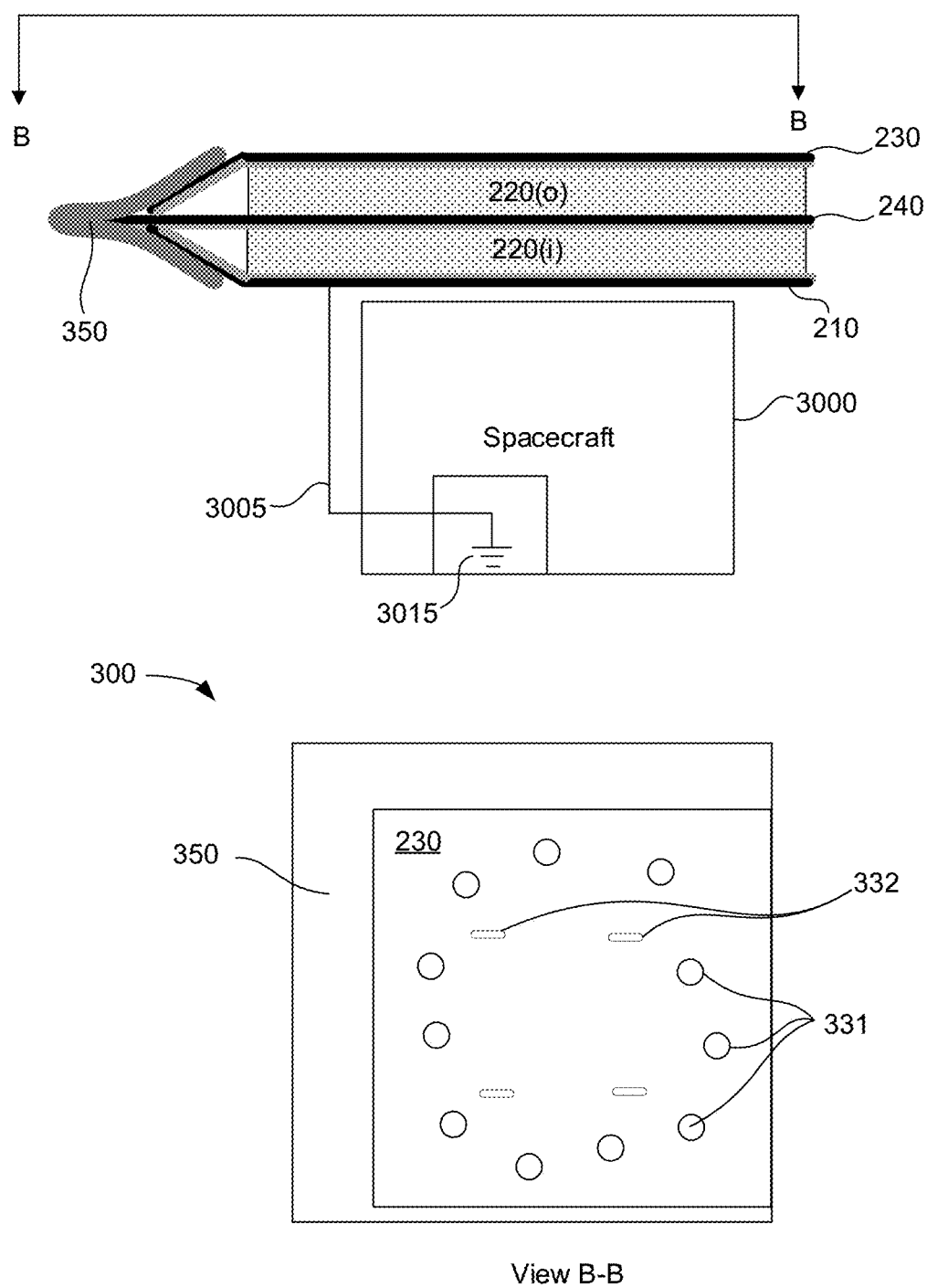
FIG. 3 illustrates an example of a particle shield and a spacecraft and a grounding scheme thereof, according to an implementation

FIG. 3 illustrates an example of a particle shield and a spacecraft and a grounding scheme thereof, according to an implementation. In the illustrated example, a particle shield 300 includes electrically conductive features that prevent unwanted electrostatic discharges between layers of the shield and/or between the shield and conductive elements of a spacecraft 3000. The electrically conductive features may be configured to provide electrical continuity between conductive portions of each layer. For example, as shown in FIG. 3, conductive portions of layers 210, 230 and 240 may be adhered together with a conductive tape 350. In some implementations, the tape may be formed from aluminum, for example, and be configured to form a conductive path between conductive portions of each of layer 210, 230 and 240. As shown schematically in FIG. 3, a further conductive path 3005 may be provided that couples at least one of the conductive tape 350 or one of the conductive portions of layers 210, 230 and 240 with an electrical ground point 3015 of the spacecraft 3000.

As may be observed in View B-B the conductive tape 350 may be configured to extend around part or all of the perimeter of the particle shield 300.

As may further be observed in View B-B outboard exterior layer 230 may be provided with perforations 331 or slits (not illustrated) to facilitate venting of the particle shield during launch ascent. Inboard exterior layer 210 and/or interior layers, (e.g., layer 240) may likewise be provided with perforations or slits to facilitate venting. Advantageously, the perforations will be arranged to facilitate venting of the entire volume defined by outboard exterior layer 230 and inboard exterior layer 210 and by. The perforations may be distributed approximately uniformly across a surface area of the layer or, as illustrated, be predominantly located near a periphery of the layer. To provide protection to the spacecraft from foreign object damage (FOD), the perforations or slits may be screened by, for example a mesh filter. One example of a suitable mesh filter is a woven stainless steel mesh filter providing about 40% open area and about 50µ opening.

Figure 4:
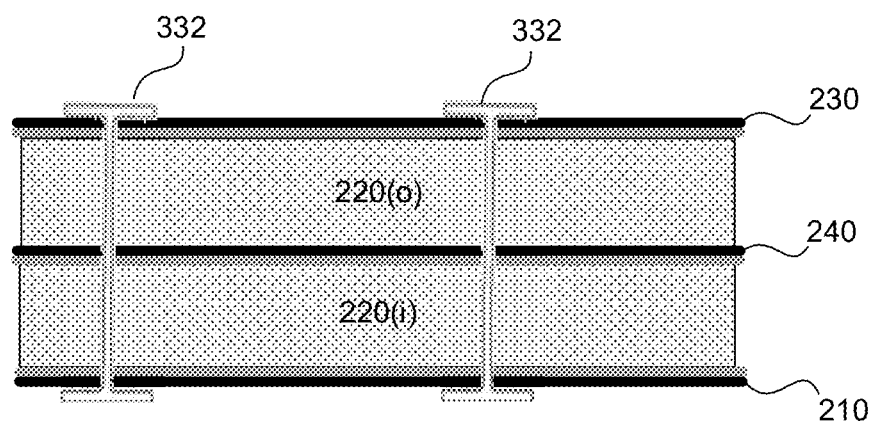
FIG. 4 illustrates an example of a spacecraft particle shield according to a yet further implementation.

It will be appreciated that the tape 350, when disposed about at least a substantial portion of the perimeter, may be configured to secure the multiple layers 210, 220, 230 and 240 as a "sandwich" like bundle. Advantageously, the bundle may be arranged such that adjacent layers are not firmly pressed together so as to permit some relative movement between layers and to facilitate out of plane bending of the bundle. Alternatively or in addition, layers of the bundle may be secured by attachment devices disposed a distance within the perimeter. For example, referring to View B-B of FIG. 3 and FIG. 4, the particle shield 300 may include one or more inserts 332 configured as tag fasteners. In some implementations, the inserts may be formed from a non-conductive plastic; in other implementations the inserts may be electrically conductive. In some implementations, the inserts may be arranged within the perimeter in a regular pattern so as to form a quilt like arrangement that prevents outward bulging of the outboard layer away that might otherwise occur as a result of venting during launch ascent. Alternatively or in addition, the multiple layers 210, 220, 230 and 240 may be stitched, sewn, or stapled together, for example.

In a typical use case, the particle shield described hereinabove may be associated with or include electromagnetic shielding, particle radiation shielding and/or thermal blankets. The thermal blankets may be conventional multilayer insulation and are typically installed outboard of all other shielding layers. Inboard of the thermal blankets, provisions for electromagnetic shielding, particle radiation shielding and the above disclosed particle shield may be arranged in any order and may be installed on the spacecraft separately, or as an integrated assembly. The particle shield, whether or not it includes or is associated with electromagnetic shielding, particle radiation shielding and/or thermal blankets, may be configured to protect otherwise vulnerable spacecraft equipment. For example, spacecraft equipment that is disposed or deployed outside hard wall enclosures may be protected by the disclosed shielding. In addition, access ports or other vulnerable openings in a hard-walled volume of the spacecraft may be protected by the disclosed particle shielding.

In some implementations, the electromagnetic shielding includes a conductive sheet that may be configured as an RF shield. When so configured, the shield may function as part of a Faraday cage arrangement. The RF shield may be formed from a polyester-aluminum laminate, for example.

In some implementations, particle radiation shielding may be formed from a metalized Kapton/polyimide sheet. The metalized portion of the sheet may be copper or a copper alloy having a thickness of 2-10 mils, for example. In some implementations the metalized portion may have a thickness of about 5 mils.

In some implementations, one or more of the layers may be joined together by a layer of adhesive. In some implementations, one or more of the layers are only loosely joined together by mechanical means such as rivets, staples, etc. As a result, pliability of the multilayer blanket may be increased, and operations involving application of adhesives or epoxies may be avoided, and differences, between the layers, in coefficient of thermal expansion are made largely irrelevant.

Figure 5:
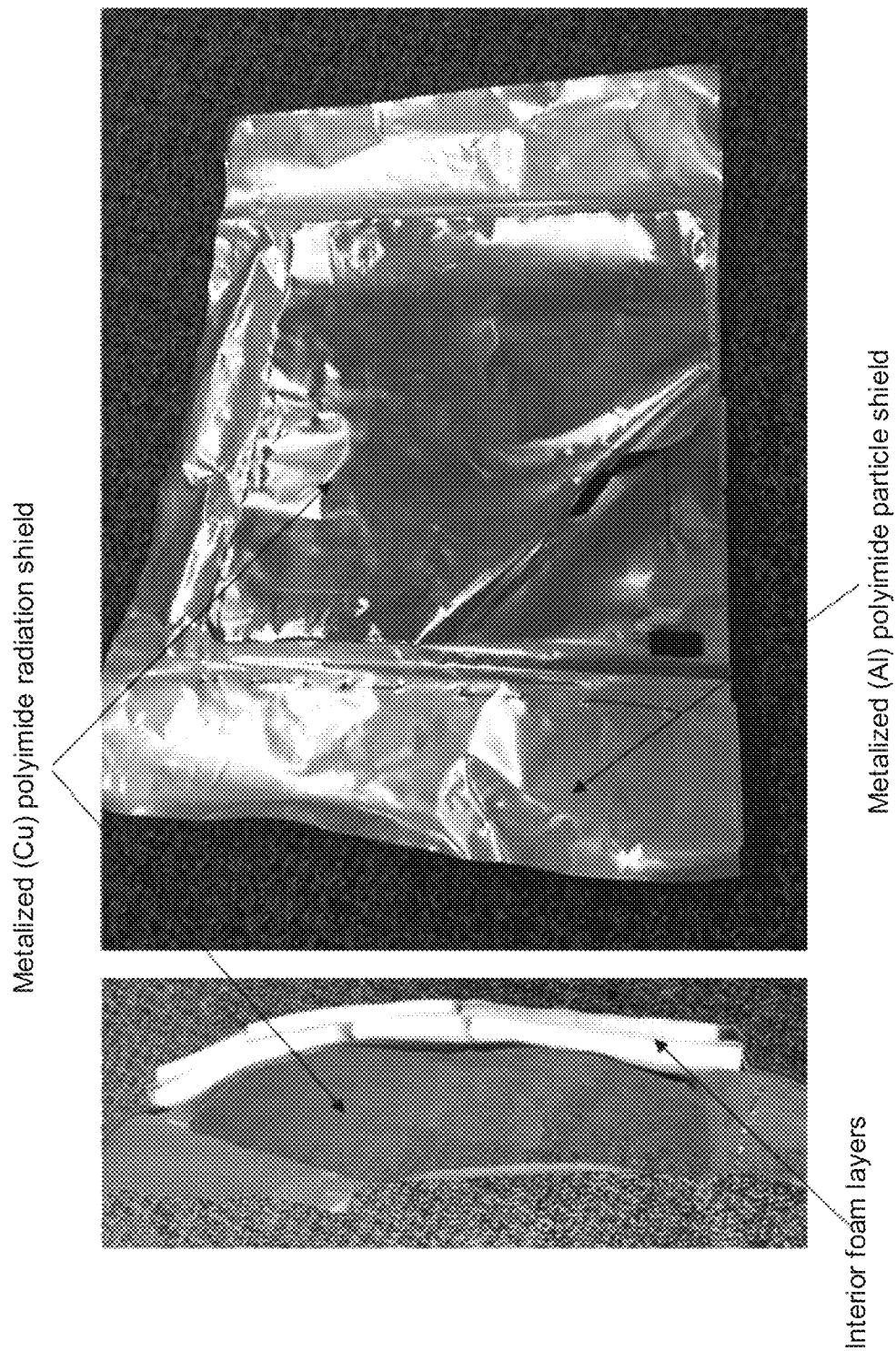
FIG. 5 illustrates an example implementation of a multi-layer particle shield.

As a result of the disclosed techniques, a reduced mass particle shield is provided that may be readily fabricated and installed. FIG. 5 illustrates an example implementation of the multi-layer particle shield.

Figure 6:
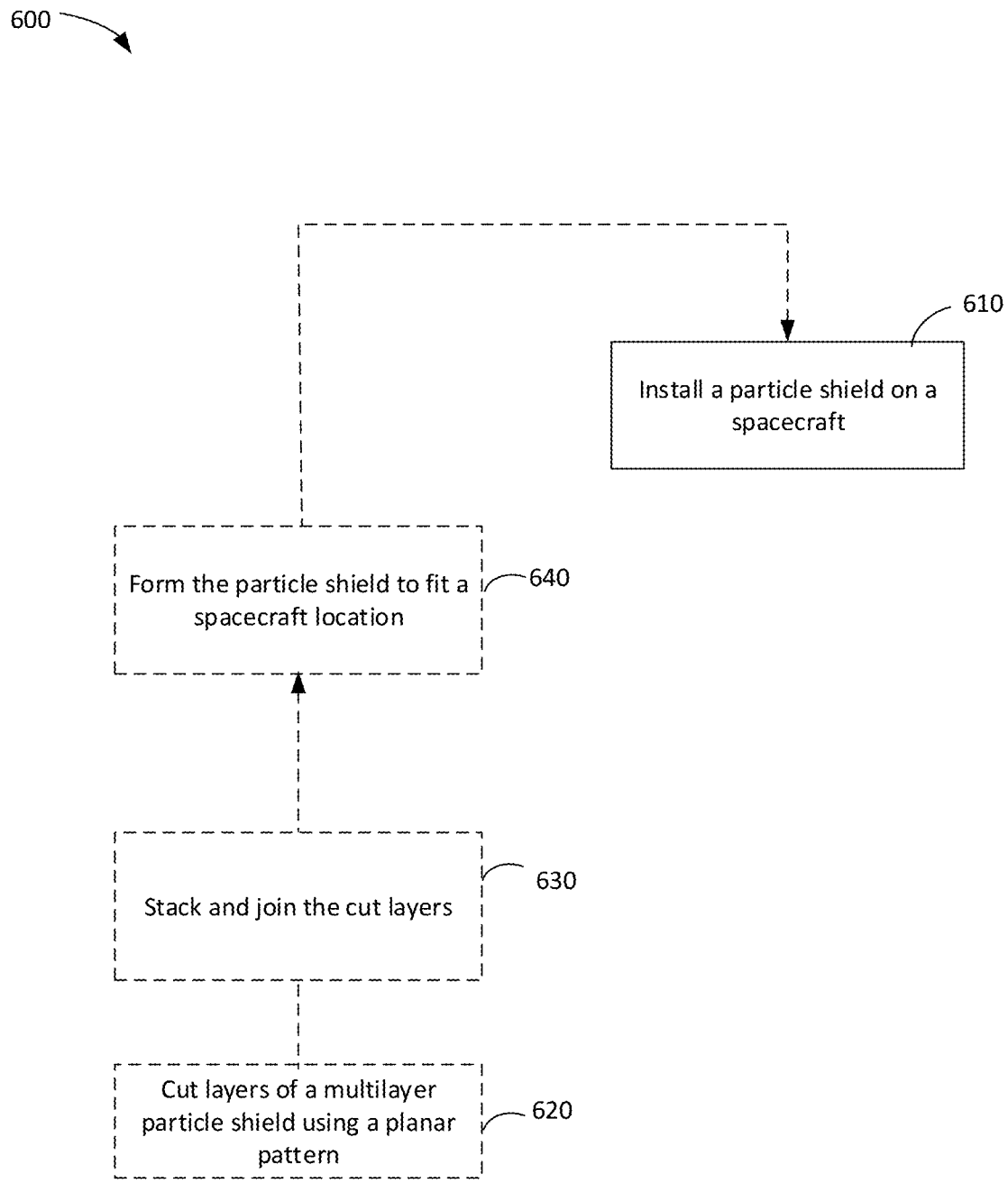
FIG. 6 illustrates a spacecraft shielding method, according to an implementation.

Referring now to FIG. 6, a spacecraft particle shielding method is illustrated. The method 600 may begin, at block 610, with installing a particle shield onto a spacecraft. The particle shield may be formed from at least two thin and flexible exterior layers of metalized polyimide and one or more relatively thick interior layers of polyimide foam as described hereinabove. Installing the particle shield may include providing an electrically conductive coupling between conductive layers of the shield and a spacecraft ground. The particle shield may be configured to protect equipment to be disposed or deployed outside hard wall enclosures, or to complete the enclosure of a hard-walled volume of the spacecraft.

Optionally, block 610 may be preceded by one or more of blocks 620, 630 and 640. At block 620 one or more layers of the particle shield may be cut (from, for example, a bulk roll of sheet stock), using a planar pattern. The cutting, in some implementations, may be performed using simple hand tools, such as shears, for example.

At block 630 the layers may be stacked and mechanically joined. The mechanical joining may be by way of an arrangement that includes an adhesive application, taping, stapling or riveting, for example. In some implementations, the mechanical coupling is sufficient to preserve integrity of the stack, while still allowing some relative motion between layers, so as to facilitate bending and forming the assembled stack.

The method may continue, at block 640, with manually forming the multilayer blanket to fit a spacecraft location. For example, the multilayer blanket may be formed to fit around a spacecraft component or to enclose a spacecraft opening.

Thus, improved particle radiation shielding techniques have been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. An apparatus comprising:
   a multilayer particle shield for a spacecraft, the particle shield including an inboard exterior layer configured to be disposed proximal to the spacecraft, an outboard exterior layer configured to be disposed distal from the spacecraft and at least one interior layer disposed between the inboard exterior layer and the outboard exterior layer, wherein:
   the interior layer includes a semi-rigid, porous, compressible spacer;
   the interior layer has a thickness no less than 50 times larger than a respective thickness of the inboard exterior layer and the outboard exterior layer; and
   the interior layer includes a polyimide foam having a density of at least 5 kg/m³ and a 50% compression force deflection greater than 5 kPa.

2. The apparatus of claim 1, wherein the inboard exterior layer and the outboard exterior layer comprise a polyester or polyimide film.

3. The apparatus of claim 2, wherein the polyester or polyimide film is metalized with an aluminum or copper alloy.

4. The apparatus of claim 1, wherein a metallized portion of each of the inboard exterior layer and the outboard exterior layer has a first thickness in the range of 1-5 mils.

5. The apparatus of claim 4, wherein the first thickness is about 2 mils.

6. The apparatus of claim 1, wherein the interior layer has a second thickness in the range of 0.1 to 0.5 inches.

7. The apparatus of claim 6, wherein the second thickness is about 0.3 inches.

8. The apparatus of claim 1, wherein:
   the interior layer includes an inboard sublayer, an outboard sublayer and a central sublayer disposed therebetween;
   the inboard sublayer and the outboard sublayer are configured as semi-rigid, porous, compressible spacers; and
   the central sublayer includes a metalized film.

9. The apparatus of claim 1, further comprising an electrically conductive coupling between at least a metalized portion of the inboard exterior layer and a metalized portion of the outboard exterior layer.

10. The apparatus of claim 9, wherein the electrically conductive coupling includes a conductive tape disposed around at least a portion of a perimeter of the particle shield.

11. The apparatus of claim 1, further comprising one or more inserts configured to prevent outward bulging of the outboard exterior layer.

12. The apparatus of claim 1, wherein one or both of the inboard exterior layer and the outboard exterior layer includes or is associated with an RF shield.

13. The apparatus of claim 12, wherein the RF shield includes a polyester-aluminum laminate.

14. The apparatus of claim 1, wherein one or both of the inboard exterior layer and the outboard exterior layer includes or is associated with a particle radiation shield.

15. The apparatus of claim 14, wherein the particle radiation shield includes copper or a copper alloy having a third thickness of about 5 mils.

16. A method comprising:
    installing a multilayer particle shield onto a spacecraft, the particle shield including a first exterior layer, a second exterior layer and at least one interior layer disposed between the first exterior layer and the second exterior layer, and
    installing the particle shield includes disposing the first exterior layer proximal to the spacecraft; wherein:
    the interior layer includes a semi-rigid, porous, compressible spacer;
    the interior layer has a thickness no less than 50 times larger than a respective thickness of the inboard exterior layer and the outboard exterior layer; and
    the interior layer includes a polyimide foam having a density of at least 5 kg/m³ and a 50% compression force deflection greater than 5 kPa.

17. The method of claim 16, wherein the first exterior layer and the second exterior layer are configured from metalized polyester film.

18. The method of claim 17, wherein:
    the interior layer includes an inboard sublayer, an outboard sublayer and a central sublayer disposed therebetween;
    the inboard sublayer and the outboard sublayer are configured as semi-rigid, porous, compressible spacers; and
    the central sublayer includes a metalized polyester film.

19. The method of claim 16, wherein:
    the particle shield includes a first electrically conductive coupling between at least a metalized portion of the first exterior layer and a metalized portion of the second exterior layer; and
    installing the particle shield includes providing a second electrically conductive coupling between the first electrically conductive coupling and an electrical ground point of the spacecraft.

20. The method of claim 16, wherein installing the particle shield includes:
- cutting, from a bulk amount of multilayer sheet stock, layers of the multilayer particle shield having a shape defined by a planar pattern;
- stacking and joining the cut layers; and
- forming the particle shield to fit a spacecraft location.

\* \* \* \* \*